May 10, 1960
T. N. CUMMINGS ET AL
2,936,161
MUTATOR
Filed Dec. 23, 1953
3 Sheets-Sheet 1
Fig. 1
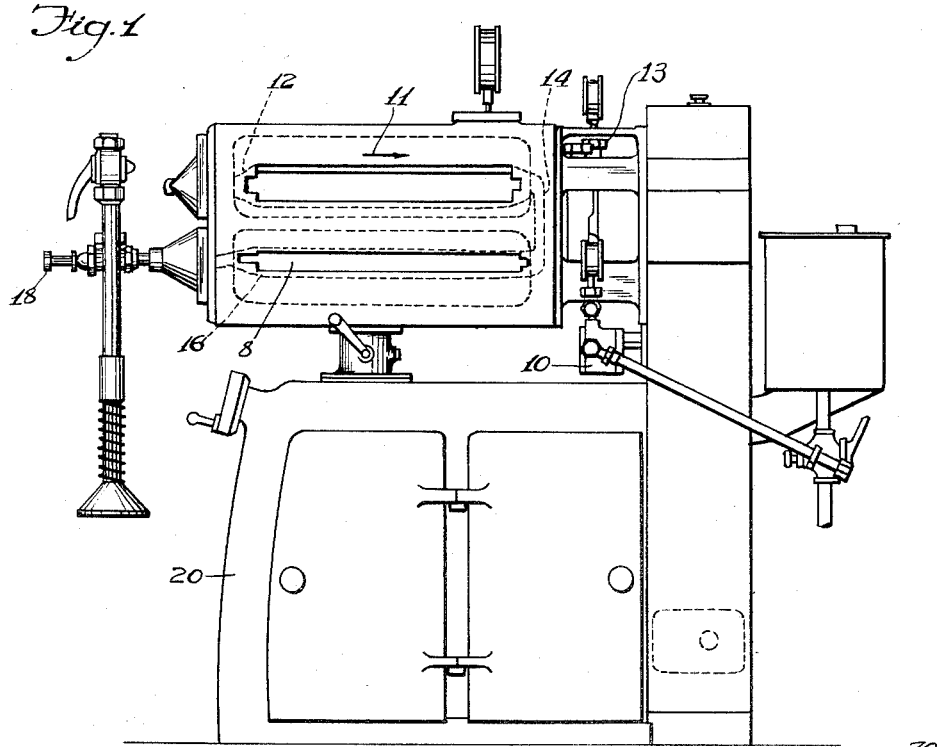
Fig. 5
Fig. 6
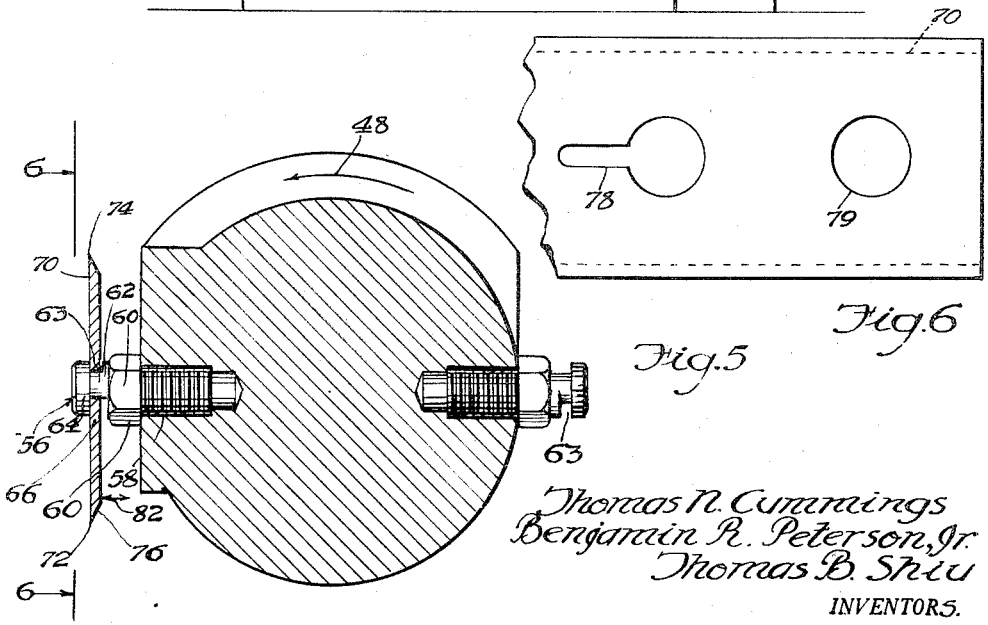
Thomas N. Cummings
Benjamin R. Peterson, Jr.
Thomas B. Shiu
INVENTORS.
BY
Attorney

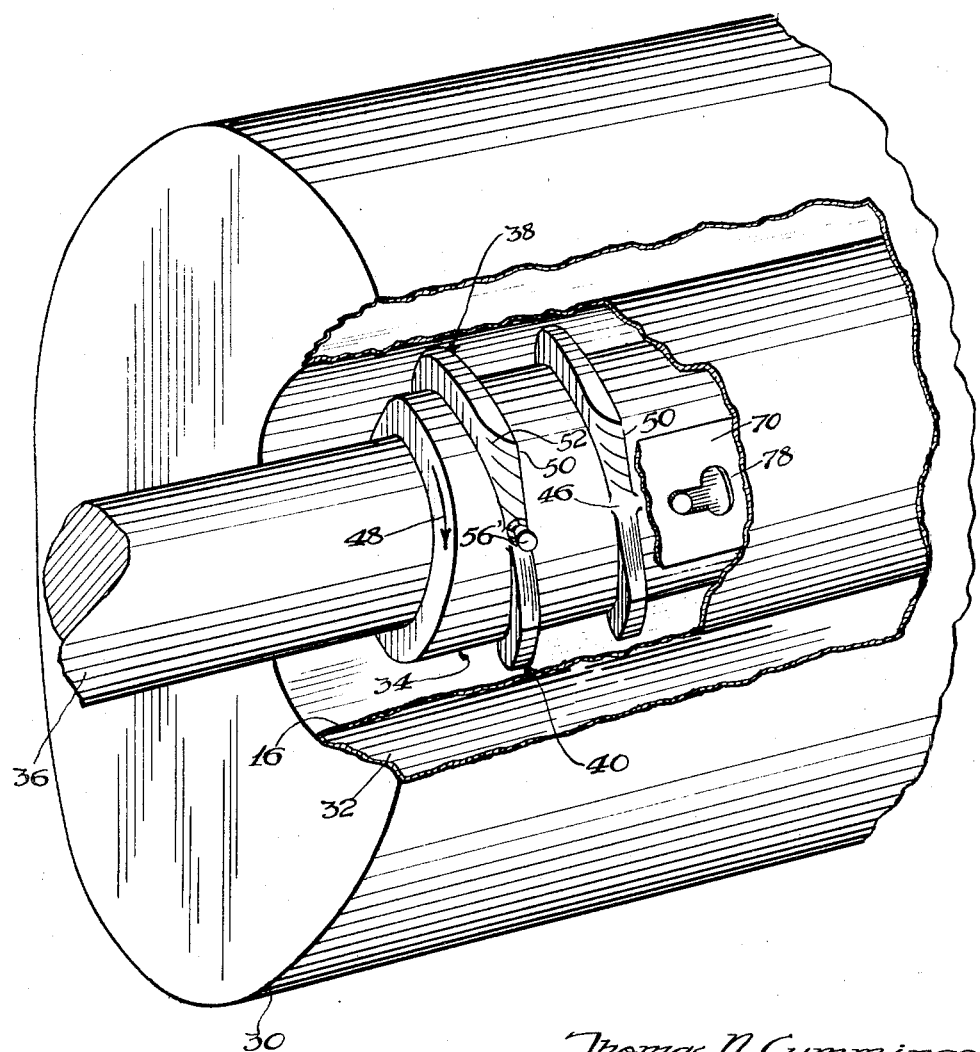

May 10, 1960
T. N. CUMMINGS ET AL
2,936,161
MUTATOR
Filed Dec. 23, 1953
3 Sheets-Sheet 3
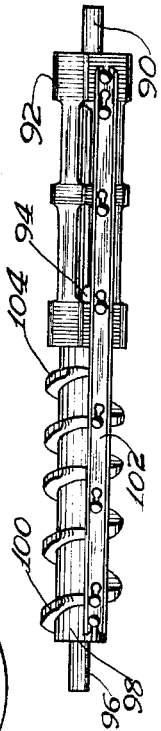
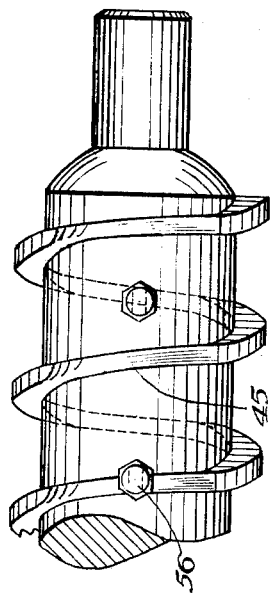
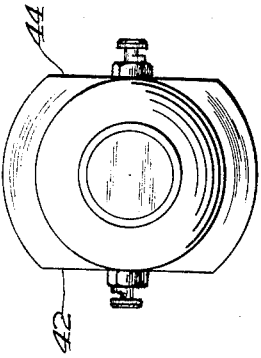
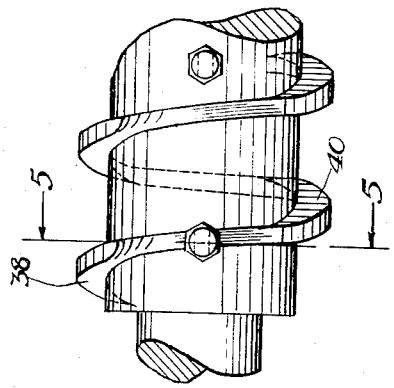
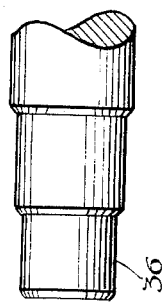
Thomas N. Cummings
Benjamin R. Peterson Jr.
Thomas B. Shiu
INVENTORS.
BY Winfred S. Stone
Attorney

United States Patent Office 2,936,161
Patented May 10, 1960

2,936,161

MUTATOR

Thomas N. Cummings, Chicago, Benjamin R. Peterson, Jr., Wheaton, and Thomas B. Shiu, Chicago, Ill., assignors, by direct and mesne assignments, to CPS Manufacturing Company, Chicago, Ill., a corporation of Illinois Application December 23, 1953, Serial No. 399,884

7 Claims. (Cl. 259—136)

This invention relates to an ice cream mutator. A mutator is a bladed element that rotates in a cylindrical chamber through which ice cream is moving under freezing conditions. Because applicants' mutator has a very specific function, it will be best to describe generally the equipment in which it will operate.

Referring to Fig. 1, applicants show the outline of a two-stage ice cream freezer. The freezing chambers are horizontally positioned one above the other and each consists of a cylinder having a cylindrical chamber axially positioned therein. In the annular space between the cylinders flows a refrigerant such as ammonia. Positioned axially of each of the inner cylinders is a mutator. The mutator is rotated by power in the cylinder. It carries scrapers which remove the ice cream from the inside walls of the cylinders. The ice cream enters the first cylinder under the force of a gear pump 10 and moves from front to back as indicated by the arrow 11. The mutator, extending substantially the entire length of the chamber 12, consists in its simplest form, in a core and a pair of longitudinal wall scrapers. The ice cream is in flowable condition as it enters this chamber 12. When it leaves, its temperature will have passed from above freezing to a point well below freezing. By the passageway 14, it enters the second chamber 16 where it passes through an identical mutator. It is finally extruded at the point 18.

The two mutators contribute nothing, or substantially nothing, to the flow of ice cream through the freezer. The flow results from the pressure provided by the gear pump 10. When the freezer is functioning smoothly, there are no air pockets in the line. The capacity of this fast freezer to deliver ice cream at the orifice 18 is dependent upon the ability of the freezer to remove heat and the ability of the gear pump to force ice cream which is stiffening to the orifice 18. The pressure which the gear pump can deliver at any point in this flow of ice cream varies inversely with the distance of the point from the pump and the stiffness of the ice cream. The resistance to flow becomes greater as the ice cream gets colder. Inasmuch as the ice cream is coldest at the maximum distance in the line from the pump, it is evident that the ability to extrude ice cream is largely dependent upon the hardness of the ice cream in the left-hand or delivery end of the second stage or cylinder 16.

Assuming a maximum rate of flow for the gear pump at the critical low temperature at the delivery orifice 18, lowering the temperature of the ice cream at the delivery orifice may prevent flow even though the power of the gear pump is doubled. These two-stage freezers extrude a standard twelve percent butter fat ice cream at 21° F. at a satisfactory speed. This is an ideal temperature for extruding ice cream into Dixie cups or pint containers preparatory to further freezing. This temperature is not satisfactory where it is desired to extrude an ice cream which will hold its shape. This requires a temperature of 17°–18° F., and extruding temperatures as low as 12°–15° F. are much better. For example, in practicing the invention disclosed in applicants' copending application Serial No. 344,051, filed March 23, 1953, now Patent No. 2,859,714, the ice cream bars can be extruded and cut off and handled readily with the temperature around 15° F. However at these temperatures, the freezer freezes up after a minute or two.

The first object of this invention is to make it possible for a standard freezer to extrude a hard, that is, a lower temperature ice cream.

The first specific object is to take the load required to extrude the hard ice cream from the gear pump and place it on a positively driven shaft. A feature of this invention is the provision of a mutator having spiral segments which push the ice cream positively toward the delivery orifice and thereby eliminate back pressure on the gear pump. Applicants use this mutator in the second or last stage only. In a single-stage freezer, it can be used in the one stage. There may be conditions where it may be used in all stages.

A second object of this invention is to adjust the movement of the hard ice cream at the delivery orifice of the second chamber very exactly to the rate of flow at the inlet.

The third object of this invention is to utilize the principle of a screw impulsion of the ice cream through the cylinder while retaining the wall scrapers.

Another object of this invention is to prevent the screw segments from beating the ice cream and breaking its structure. A feature of the invention is the provision of a rounded leading edge on each of the screw segments.

Another object of this invention is to provide a combination beater and screw mutator.

These and such other objects as may hereinafter appear are attained in the embodiment of the invention shown in the accompanying drawings wherein:

Fig. 1 is a side elevation of a two-stage freezer;

Fig. 2 is a perspective view partly cut away of the delivery end of the second stage of said freezer and the end of applicants' mutator positioned therein;

Fig. 3 is a side elevation of applicants' mutator;

Fig. 4 is an end view of applicants' mutator;

Fig. 5 is a view taken on the line 5—5 of Fig. 3, but showing one blade in position;

Fig. 6 is a view of the end of a blade taken on the line 6—6 of Fig. 5; and,

Fig. 7 is a side elevation of a combination beater type and screw mutator for a single-stage freezer.

Continuing to refer to the drawings and particularly to Fig. 1, applicants' mutator is designed primarily for use in the second stage of a two-stage freezer. In this figure, the base 20 carries the drive equipment and supported above is the two-stage freezer heretofore described. The longitudinal casing contains two horizontal cylindrical chambers 12 and 16, and in each is positioned a mutator, whose function in present apparatus is to carry a longitudinal scraper which sweeps the inside walls of the chamber and prevents the formation of ice on these walls. Between the wall of the inside chamber and the wall of an outside chamber flows ammonia. The ice cream is forced by the pump 10 into the front end of the cylinder 12 and follows the arrow 11 down into the second chamber through passageway 14 and out through the orifice 18.

Referring now to Fig. 2, the cylindrical wall to the outer chamber 30 concentrically encloses the inner chamber 16. In the annular space 32 flows ammonia.

Mounted centrally of the chamber 16 is applicants' mutator 34. This mutator, referring also to Figs. 3 and 4, consists of a steel shaft 36 whose ends are reduced to provide bearings which seat in journals, not shown. Extending along the body of the shaft are two rows of thread segments or wales 38 and 40. These thread segments are portions of a continuous spiral thread which was turned upon the shaft. The whole may be described as a worm. After the continuous thread was formed, referring to Fig. 4, the threads were cut along two parallel tangents 180° apart, 42 and 44. The thread segments fail to form a continuous thread at the points 46, see Fig. 2.

With the shaft turning in the direction of the arrow 48, the leading edges 50 of the thread segments which engage the ice cream, tend to break down its structure. To avoid this, the leading edge 50 is beveled as indicated at 52.

The purpose of slicing off the thread to form thread segments is twofold. When applicants first decided to remove the driving load in the second stage from the gear pump, they mounted a simple screw in the chamber 16. That is to say, the mutator 36 had a continuous thread on it, and the clearance between the periphery of the thread and the inside wall of the chamber are very small. Applicants believed that the surface of the thread could keep the inside wall of the chamber free of ice or ice cream. In this they were wrong. As will be explained, the threads would not perform the function of the long used blades which are pressed against the inside wall of the chamber and scrape it at right angles. It was consequently necessary to retain the blades, and while this could be done by using independent blades between a continuous thread, which applicants tried, the applicants discovered that the use of the thread segments had the additional advantage of providing a desirable release of back pressure, which will be discussed hereinafter.

Disposed in a row parallel with the length of the mutator 36 through the points 46 are posts 56. These posts comprise, referring to Fig. 5, a threaded shank 58, a lock nut 60, a shank 62, an open-sided slot 63 in the shank parallel to the length of the mutator, and a head 64. Mounted on these posts 56 is a flexible blade 70, see Figs. 2 and 5. The blade 70 has a leading edge 72 and a trailing edge 74, with the beveled surface 76 facing the mutator core. The blade carries a row of keyhole slots 78 so that the slots 78 may be seated over the head 64 and then pushed into the slots 63. The holes in the blade 70 which are intended to seat over the two end posts such as 56' are not keyholes but round holes such as 79. The blade is sufficiently flexible so that by positioning the large opening of the keyholes over each of the other posts, the end hole may be forced over the end post 56'. This hole 79 prevents endwise movement of the blade.

Referring to Fig. 5, the blade 70 can pivot laterally on the posts as indicated by the double arrow 82. The slot 63 is wider than the thickness of the blade 70. This freedom of movement of the blade enables the ice cream to hold the blade firmly against the side of the chamber, rendering adjustment unnecessary.

In use, the mutator is turning in the direction of the arrow 48. The ice cream forces the blades such as 70, there being two of them, outwardly so that the blade scrapes the inside surface of the cylindrical chamber 16. While applicants' arrangement for permitting the blade to pivot freely under the action of the ice cream is believed to be new, the general idea of the blade loosely mounted on a mutator is old. The ice cream is free to move circumferentially or longitudinally of the mutator so far as the blade 70 is concerned.

The thread segments 38 and 40 engage the ice cream with their leading edge 52, referring to Fig. 2, and force it to the left. If pressure on the delivery end of the line becomes great, there will be a tendency for the ice cream to back up along the channel beneath each of the blades 70. However, this is not great and is in fact desirable.

It is evident that the proper functioning of applicants' mutator is dependent upon the rate of flow of the ice cream into the inlet of the second stage of the freezer.

If the rate of flow from the gear pump exceeds the rate of flow produced by the thread segments, these segments will resist the flow of ice cream and create a back pressure on the pump. What is wanted is a speed on the mutator such that at the receiving end of the cylinder 16, it will pick up the ice cream and advance it along the tube. Actually, there is a fairly wide range for the speed of the ice cream as it enters this second stage because the resistance to movement of the ice cream becomes great in this second chamber, and even if the ice cream is flowing a little too fast at the inlet, its temperature is dropping so fast and its hardness is increasing so rapidly that within a few inches, it will be relying upon the thread segments to force it through the chamber. The cut-out portions between the thread or wale segments compensate for inequalities between the pump pressure and the speed of rotation of the mutator. Additionally, applicants can regulate the speed of the mutator 8 by changing the gears 13, Fig. 1, so that the push of the mutator may be regulated independently of the pump pressure. The means for doing this are gears, not shown.

In Fig. 7, applicants disclose a combination beater and screw type mutator. Mounted on the receiving end of a shaft 90 is a hollow cylindrical housing 92 carrying internal beaters 94, the specific construction of which need not be described as this is standard. Some mutators are solid metal with a square cross section. However the beater element is arranged, it is designed to move the ice cream circularly around the chamber as it is pushed longitudinally. The delivery end 96 has been turned to form the central core and thread segments 100, which are identical with those shown in Fig. 3. The scraping blades such as 102 are mounted on posts in the fashion heretofore described in connection with Figs. 2 and 3. A single blade extends the entire length of the mutator. While the mutator in Fig. 7 has the beater portion 92 of a length equal to that of the screw segment portion, it will be appreciated that the lengths of these two portions may be varied to meet the requirements of a particular mix.

In a single chamber freezer, the pump will force the ice cream to the first thread segment 104, and thereafter the threads will positively advance the ice cream to the delivery orifice. Their combination mutator will increase the capacity of the single chamber ice cream freezer in the same way that applicants' standard mutator increases the capacity in the double-chamber freezer. Present freezers have a cooling capacity substantially in excess of their pumping capacity.

Having thus described their invention, applicants claim:

1. A mutator comprising an elongated cylindrical member, a spiral thread mounted on the surface of said member and having its axis coincident with the axis of the cylindrical member, portions of said thread being cut out from the peripheral edge of the thread to its junction with the cylindrical member to form spiral thread segments, and a scraper blade having a straight edge mounted on the cylindrical member radially outwardly of said cut-out portions and parallel to the axis of the cylindrical member, the plane of the surface of the blade being tangent to a radius of the cylindrical member.

2. The mutator of claim 1 wherein the leading edge of each thread segment is beveled on the load side.

3. A mutator comprising a shaft, wale segments all positioned in the path of a spiral having the same axis as the shaft disposed on the surface of the shaft, comparable ends of the wale segments lying in a straight line parallel with the shaft axis to form a longitudinal passageway on the surface of the shaft between the wale segments, and a scraper blade positioned between the wale segments and having a straight edge parallel to the shaft axis more distant therefrom than the outer peripheries of the wale segments, the plane of said blade being generally tangent to a radius of the shaft.

4. A mutator comprising an elongated cylindrical member, a spiral thread mounted on the surface of said member and having its axis coincident with the axis of the cylindrical member, those portions of the thread intersecting a line on the cylindrical member's surface parallel to its axis being cut away in the plane of the tangents through said line to form spiral thread segments, outwardly extending posts mounted on the cylindrical member along said line, and a blade having a straight edge mounted on said posts with the straight edge more distant from said axis than the peripheries of the thread segments.

5. The mutator of claim 4 wherein the blade is loosely mounted on the posts so that the blade may rock on the posts at right angles to its length.

6. A mutator comprising an elongated cylindrical member, a spiral thread mounted on the surface of said member and having its axis coincident with the axis of the cylindrical member, those portions of the thread intersecting a line on the cylindrical member's surface parallel to its axis being cut away in the plane of the tangents through said line to form spiral thread segments, outwardly extending posts mounted on the cylindrical member along said line, an open-sided slot in the side wall of each post, said slots lying in a single straight line, an elongated flat blade having a thickness along its longitudinal medial line less than the width of said slots, and keyhole openings spaced by the same distance as the spacing of the posts mounted along said medial line of the blade and adapted to be slipped into said slots.

7. A mutator comprising an elongated cylindrical member, a spiral thread mounted on the surface of one end of said member and having its axis coincident with the axis thereof, portions of said thread being cut out from the peripheral edge of the thread to its junction with the surface of the cylindrical member to form thread segments, an element on the surface of the other end of the cylindrical member adapted to move material around the axis of the member, and a scraper blade having a straight edge mounted along the entire length of the cylindrical member with the edge parallel to the axis of the said member and the plane of its surface being tangent to a radius of the cylindrical member, said blade being radially positioned at a greater distance from said axis than the outside surface of the spiral thread.

References Cited in the file of this patent
UNITED STATES PATENTS

| | | |
|---|---|---|
| 1,363,368 | Sonsthagen | Dec. 28, 1920 |
| 1,957,707 | Glauser | May 8, 1934 |
| 2,063,065 | Vogt et al. | Dec. 8, 1936 |
| 2,211,387 | Routh | Aug. 13, 1940 |
| 2,268,905 | Schaub et al. | Jan. 6, 1942 |
| 2,278,340 | Weinreich et al. | Mar. 31, 1942 |
| 2,309,424 | Weinreich et al. | Jan. 26, 1943 |
| 2,506,101 | Oltz | May 2, 1950 |
| 2,631,016 | Laubarede | Mar. 10, 1953 |
| 2,645,911 | Martin | July 21, 1953 |